United States Patent
Narayan et al.

(10) Patent No.: US 10,026,053 B1
(45) Date of Patent: Jul. 17, 2018

(54) SYSTEM AND METHOD FOR GENERATION OF INTEGRATED TEST SCENARIOS

(71) Applicant: Wipro Limited, Bangalore (IN)

(72) Inventors: Ganesh Narayan, Bangalore (IN); Selvan Nagaraja, Bangalore (IN); Hemantha Kumar Choudam, Bangalore (IN); Shaik Asha, Chennai (IN)

(73) Assignee: Wipro Limited, Bangalore (IN)

( * ) Notice: Subject to any disclaimer, the term of this patent is extended or adjusted under 35 U.S.C. 154(b) by 17 days.

(21) Appl. No.: 15/450,910

(22) Filed: Mar. 6, 2017

(30) Foreign Application Priority Data

Jan. 18, 2017 (IN) .............. 201741002008

(51) Int. Cl.
- *G06F 9/44* (2018.01)
- *G06Q 10/06* (2012.01)
- *G06F 17/18* (2006.01)
- *G06F 17/27* (2006.01)

(52) U.S. Cl.
CPC .......... *G06Q 10/067* (2013.01); *G06F 17/18* (2013.01); *G06F 17/2785* (2013.01)

(58) Field of Classification Search
None
See application file for complete search history.

(56) References Cited

U.S. PATENT DOCUMENTS

| | | | |
|---|---|---|---|
| 7,506,312 B1* | 3/2009 | Girolami-Rose | G06F 8/71 717/101 |
| 8,799,714 B1* | 8/2014 | Guruswamy | G06F 11/3684 714/25 |
| 2015/0293837 A1* | 10/2015 | Rajamanickam | G06F 11/3676 717/130 |
| 2015/0309918 A1* | 10/2015 | Raghavan | G06F 11/3688 714/38.1 |
| 2015/0324274 A1* | 11/2015 | Raghavan | G06F 11/3684 717/124 |

* cited by examiner

*Primary Examiner* — Rongfa Philip Wang
(74) *Attorney, Agent, or Firm* — LeClairRyan PLLC

(57) ABSTRACT

This disclosure relates to generating integrates test scenarios. The method includes creating a test process model comprising a plurality of processes and one or more interaction paths amongst the plurality of processes based on business process information; identifying a plurality of test scenarios based on an analysis of the plurality of processes and the one or more interaction paths amongst the plurality of processes, wherein each of the plurality of test scenarios comprises a unique process flow path; determining a risk weight and a criticality weight associated with each of the plurality of test scenarios; and identifying at least one test scenario from the plurality of test scenarios based on a comparison of the risk weight and the criticality weight determined for each of the plurality of test scenarios with an associated threshold weight.

20 Claims, 8 Drawing Sheets

SYSTEM AND METHOD FOR GENERATION OF INTEGRATED TEST SCENARIOS

This application claims the benefit of Indian Patent Application Serial No. 201741002008, filed Jan. 18, 2017, which is hereby incorporated by reference in its entirety.

TECHNICAL FIELD

This disclosure relates generally to software testing and more particularly to system and method for generation of integrated test scenarios.

BACKGROUND

For completely and exhaustively testing business processes, users may need to analyze and arrive at multiple test scenarios for these business processes. Processing all possible test scenarios that may be generated based on combination of various processes results in a large volume of test cases. Executing or designing such large volume of test cases is neither practical nor efficient.

There is therefore a need of method and system that facilitates arriving at best possible set of test cases, based on intelligent parameters, so that the number of derived test cases are brought to a manageable level, while ensuring maximum coverage and quality.

SUMMARY

In one embodiment, a method for generation of integrated test scenarios is disclosed. The method includes creating, by a computing device, a test process model comprising a plurality of processes and one or more interaction paths amongst the plurality of processes based on business process information, wherein an interaction path between two processes from the plurality of processes define a flow between the two processes; identifying, by the computing device, a plurality of test scenarios based on an analysis of the plurality of processes and the one or more interaction paths amongst the plurality of processes, wherein each of the plurality of test scenarios comprises a unique process flow path comprising at least one of the plurality of processes and at least one of the one or more interaction paths; determining, by the computing device, a risk weight and a criticality weight associated with each of the plurality of test scenarios; and identifying, by the computing device, at least one test scenario from the plurality of test scenarios based on a comparison of the risk weight and the criticality weight determined for each of the plurality of test scenarios with an associated threshold weight.

In another embodiment, a computing device for generating integrated test scenarios is disclosed. The computing device includes a processor; and a memory communicatively coupled to the processor, wherein the memory stores processor instructions, which, on execution, causes the processor to create test process model comprising a plurality of processes and one or more interaction paths amongst the plurality of processes based on business process information, wherein an interaction path between two processes from the plurality of processes define a flow between the two processes; identify a plurality of test scenarios based on an analysis of the plurality of processes and the one or more interaction paths amongst the plurality of processes, wherein each of the plurality of test scenarios comprises a unique process flow path comprising at least one of the plurality of processes and at least one of the one or more interaction paths; determine a risk weight and a criticality weight associated with each of the plurality of test scenarios; and identify at least one test scenario from the plurality of test scenarios based on a comparison of the risk weight and the criticality weight determined for each of the plurality of test scenarios with an associated threshold weight.

In yet another embodiment, a non-transitory computer-readable storage medium having is disclosed. The non-transitory computer-readable storage medium has instructions stored thereon, a set of computer-executable instructions for generating integrates test scenarios, causing a computer comprising one or more processors to perform steps comprising: creating, by a computing device, a test process model comprising a plurality of processes and one or more interaction paths amongst the plurality of processes based on business process information, wherein an interaction path between two processes from the plurality of processes define a flow between the two processes; identifying, by the computing device, a plurality of test scenarios based on an analysis of the plurality of processes and the one or more interaction paths amongst the plurality of processes, wherein each of the plurality of test scenarios comprises a unique process flow path comprising at least one of the plurality of processes and at least one of the one or more interaction paths; determining, by the computing device, a risk weight and a criticality weight associated with each of the plurality of test scenarios; and identifying, by the computing device, at least one test scenario from the plurality of test scenarios based on a comparison of the risk weight and the criticality weight determined for each of the plurality of test scenarios with an associated threshold weight.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
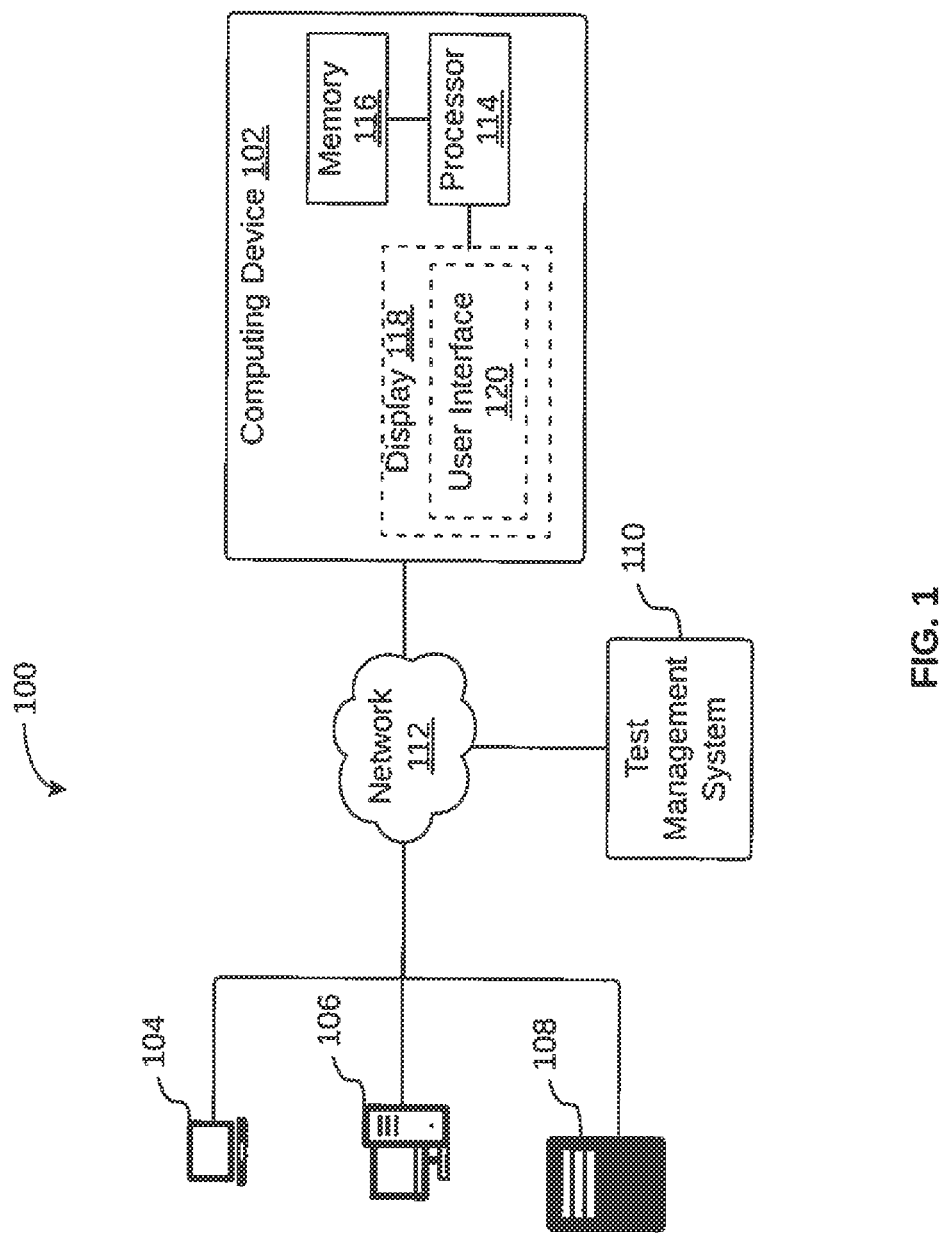
FIG. 1 illustrates an environment (that is exemplary) in which various embodiments may function.

Additional illustrative embodiments are listed below. In one embodiment, an environment 100 (that is exemplary) in which various embodiments may function is illustrated in FIG. 1. Environment 100 includes a computing device 102 that communicates with a plurality of external computing devices (for example, a laptop 104, a desktop 106, a server 108) and a test management system 110 via a network 112. Test management system 110 may be a part of one of the plurality of external computing devices. Other examples of external devices may include, but are not limited to a tablet, a phablet, an application server, a router, switches, a gateway, a bridge, a modem, a HUB, and a Multistation Access Unit (MAU). Network 110 may be a wireless or a wireline network.

Computing device 102 generates integrated test scenarios, which is a manageable set of test scenarios, by eliminating redundant test scenarios. The integrated test scenarios are then fed into test management system 110 for execution. Test management system 110 may be any test management tool (for example, HP Quality Center or Testlink) that stores all the integrated test scenarios received from computing device 102. Test management system 110 may also be a part of computing device 102. Computing device 102 includes a processor 114 that is communicatively coupled to a memory 116. Memory 116 further includes various modules that enable computing device 102 to generate integrated test scenarios. This is explained in detail in conjunction with FIG. 2. Computing device 102 further includes a display 118 having a User Interface (UI) 120 that may be used by a user to provide inputs, when required, in order to generate the integrated test scenarios. Display 118 may further be used to display result of execution of the integrates test scenarios by test management system 110 to the user.

Figure 2:
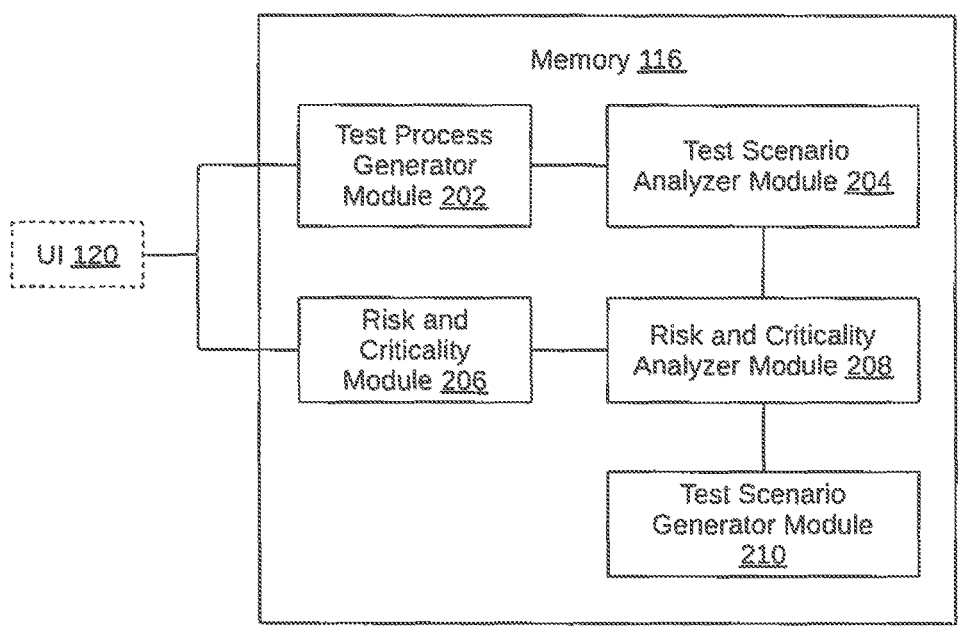
FIG. 2 is a block diagram illustrating various modules in a memory of a computing device configured to generate integrated test scenarios, in accordance with an embodiment.

Referring now to FIG. 2, a block diagram illustrating various modules stored in memory 116 of computing device 102 configured to generate integrated test scenarios, in accordance with an embodiment. Memory 116 includes a test process generator module 202, a test scenario analyzer module 204, a risk and criticality module 206, a risk and criticality analyzer module 208, and a test scenario generator module 210. Business process information is provided to computing device 102 either as business process model or business process instructions in natural language by a user via UI 120. UI 120 is coupled to memory 116 through an interface that may be implemented as a web service, to facilitate easy exchange of data.

Test process generator module 202 in memory 116 receives the business process information and creates a test process model. The test process model includes a plurality of processes and one or more interaction paths amongst the plurality of processes. The creation of test process model is further explained in detail in conjunction with FIG. 4. The test process model is used by test scenario analyzer module 204 to identify a plurality of test scenarios based on an analysis of the plurality of processes and the one or more interaction paths in the test process model. Each test scenario includes a unique process flow path that further includes at least one of the plurality of processes and at least one of the one or more interaction paths. This is further explained in detail in conjunction with FIGS. 5A and 5B.

Risk and criticality analyzer module 208 receives the plurality of test scenarios from the test scenario analyzer module 204. Risk and criticality analyzer module 208 also receives risk and criticality inputs from risk and criticality module 206, which receives these inputs from a user for each business process instruction through UI 120 and subsequently stores them. When the user does not provide these risk and criticality inputs, risk and criticality module 206 may determine risk and criticality levels based on a method described in detail in conjunction with FIG. 6. In an embodiment, risk levels assigned by the user or determined by risk and criticality module 206 may be: high, medium, and low and criticality levels may be: critical, normal, and low. By way of an example, business process instructions, such as, login and payment may be assigned "critical" and "high risk," while business process instructions that are related to cosmetic aspects might be assigned a low risk.

Based on the risk and criticality inputs received, risk and criticality analyzer module 208 determines a risk weight and a criticality weight associated with each of the plurality of test scenarios. Thereafter, risk and criticality analyzer module 208 identifies one or more test scenarios from the plurality of test scenarios based on a comparison of the risk weight and the criticality weight determined for each of the plurality of test scenarios with an associated threshold weight. This is further explained in detail in conjunction with FIG. 3 and FIG. 6.

Test scenario generator module 210 then generates a final list of test scenarios that includes the one or more test scenarios identified by risk and criticality analyzer module 208 and provides this final list of test scenarios to test management system 110, which is an external module that interfaces with the test scenario generator module 210 through a web service or API. After receiving the final list of test scenarios, test management system 110 stores these test scenarios, executes them, and stores the execution results of these test scenarios.

Figure 3:
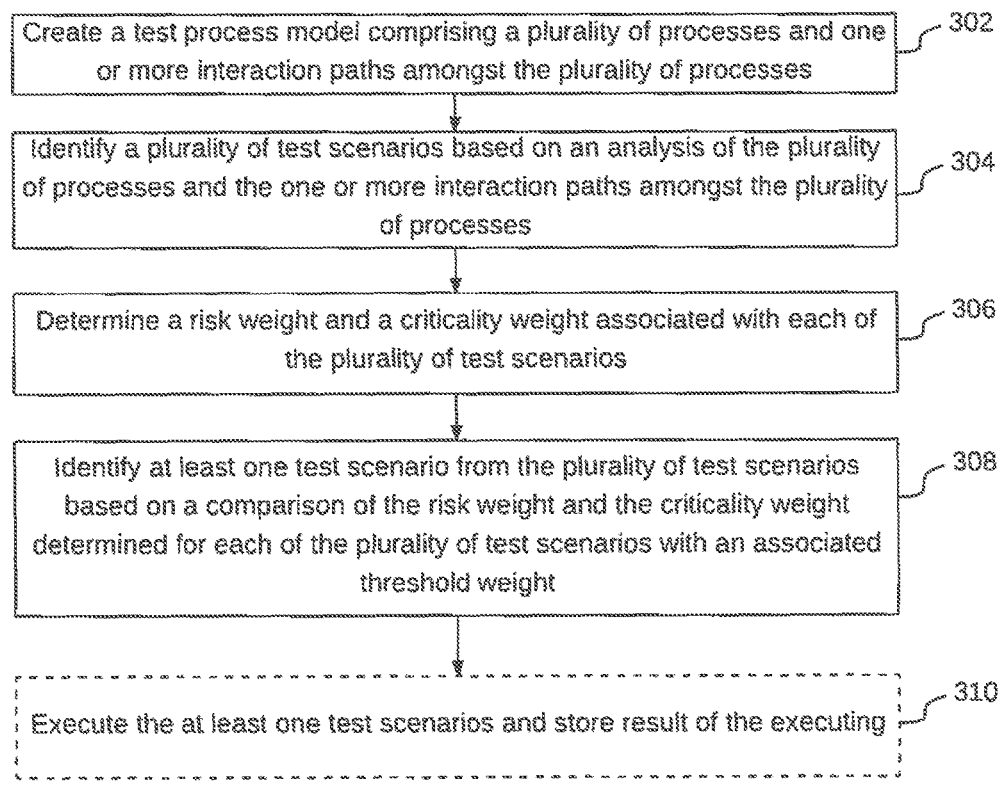
FIG. 3 illustrates a flowchart of a method for generating integrated test scenarios, in accordance with an embodiment.

Referring now to FIG. 3, a flowchart of a method for generating integrated test scenarios is illustrated, in accordance with an embodiment. To this end, business process information is first received by computing device 102, which may either be retrieved automatically or may be provided by a user through UI 120. Business process information may be a business process model. Alternatively, business process information may be business process instructions provided by a user in natural language. At 302, computing device 102 uses the business process information to create a test process model. The method steps followed to create the test process model differ based on whether the business process information includes a model or business process instructions. This is further explained in detail in conjunction with FIG. 4.

The test process model thus generated using either methods includes a plurality of processes and one or more interaction paths amongst these plurality of processes. An interaction path between two processes from the plurality of processes define a flow between the two processes. By way of an example, a "Login" activity and a "Logout" activity are two different processes and an interaction path between these processes will be the flow of control from one process to the other, indicating that the "Logout" activity must happen only after the "Login" activity.

Thereafter, at 304, computing device 102 identifies a plurality of test scenarios based on an analysis of the plurality of processes and the one or more interaction paths in the test process model. Each test scenario includes a unique process flow path that further includes one or more processes and one or more interaction paths. In other words, when there are two test scenarios, they both will have a different process flow path. By way of an example, one of the process flow paths may be represented as 1→2→3→4→5→6. In this process flow path, each of 1, 2, 3, 4, 5, and 6 represent a process and '→' represents the interaction path between two processes separated '→.' Similarly, the other process flow path may be represented as 3→5→6→7→9. As is apparent, both the process flow paths are different. Identification of test scenarios from the test process model is discussed in detail in conjunction with FIGS. 5A and 5b.

Once the plurality of test scenarios have been identified, computing device 102 determines a risk weight and a criticality weight associated with each of the plurality of test scenarios at 306. The risk weight and the criticality weight may be determined based on risk and criticality level inputs provided by a user along with the business process information via UI 120. In absence of risk and criticality level input from the user, the risk weight and the criticality weight for a test scenario may be determined using the method discussed in FIG. 6.

Thereafter, at 308, computing device 102 identifies one or more test scenarios from the plurality of test scenarios based on a comparison of the risk weight and the criticality weight determined for each of the plurality of test scenarios with an associated threshold weight. The one or more test scenarios are identified, such that, the risk weight and the criticality weight for each of the one or more test scenarios are greater than associated threshold weights. In other words, a given test scenario is identified by computing device 102, when a risk weight determined for the test scenario is greater than a risk threshold weight and a criticality weight of that test scenario is greater than a criticality threshold weight. This is further explained in detail in conjunction with FIG. 6.

Computing device 102 then sends these one or more test scenarios identified at 308 to test management system 110, which then executes these test scenarios and stores result of the executing at 310.

The method enables efficient management of test suite for regression testing as well as functional testing and results in reduction of cycle time for completion of testing. The method also provides better coverage of functional requirements while testing minimal test cases. Moreover, visual representation of generation of integrated scenarios facilitates better management of test cases.

Figure 4:
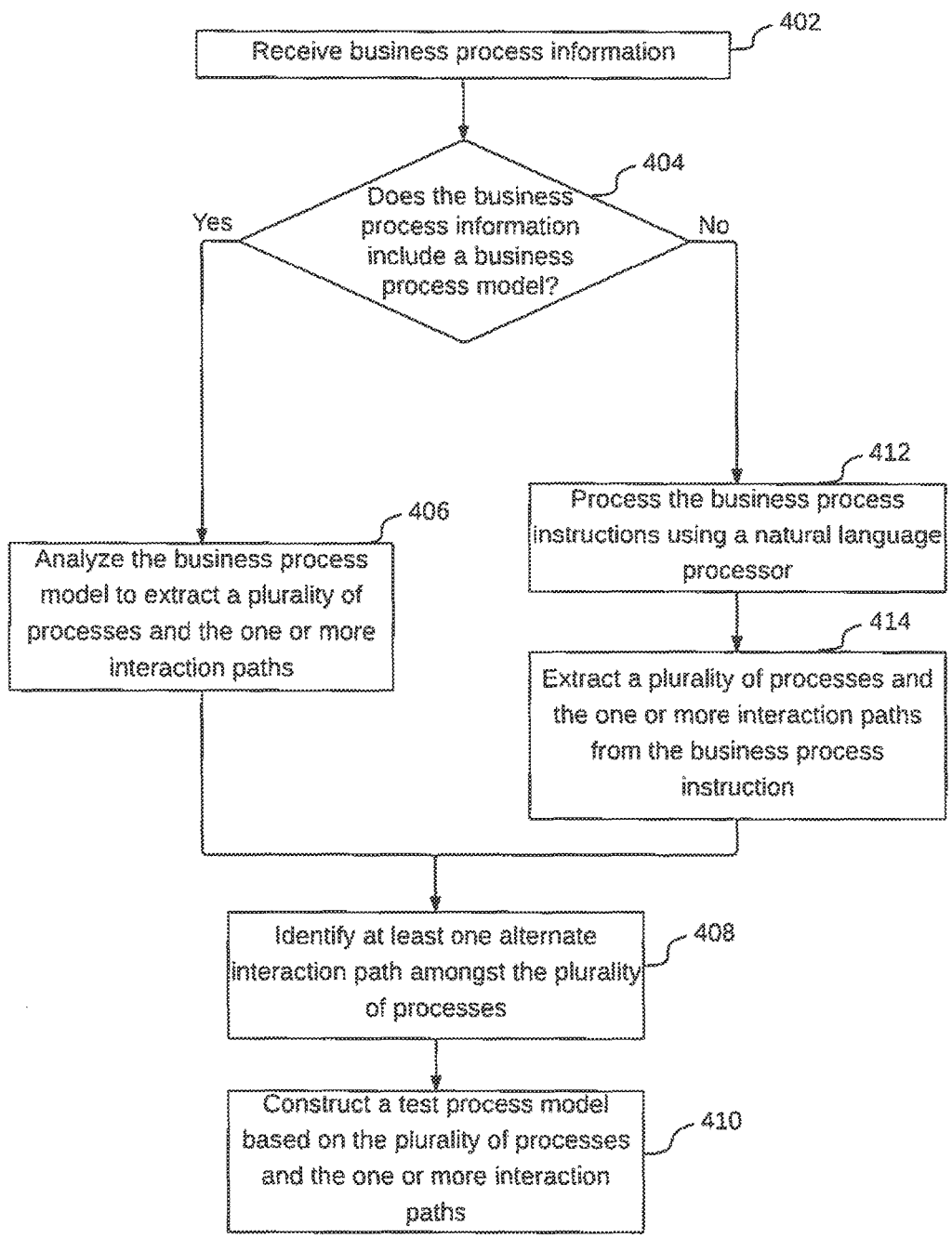
FIG. 4 illustrates a flowchart of a method for creating a test process model, in accordance with an embodiment.

Referring now to FIG. 4, a flowchart of a method for creating a test process model is illustrated, in accordance with an embodiment. At 402, the business process information is received. Thereafter, at 404, a check is performed to determine whether the business process information includes a business process model. If the business process information includes a business process model, at 406, the business process model is analyzed to extract a plurality of processes and one or more interaction paths amongst the plurality of processes. While performing the analysis, model elements within the business process model, which are related to a business process activity are considered as processes. By way of an example, any activity that represents an action from a user is classified as a process. In an embodiment, when a business process model that is created in Unified Modelling Language (UML) or XML Process Definition Language (XPDL) notation are analyzed, activities represented as "blocks" in the business process model are considered as processes. These business process models may be generated using tools, such as, and not limited to ARTS, Pega, or Bizagi. By way of an example, a business process model includes a block that depicts "login to an application" followed by a block that depicts "create an order." These actions are separated out as "login" and "order creation" and considered as different processes for the test process model.

After identifying the processes, one or more interaction paths between these processes are also identified automatically from the business process model. An interaction path is depicted as the flow of control happening from one process to another in the test process model. In continuation of the example above, an interaction path between the processes "login" and "order creation" depicts the flow from "login" to "order creation," and may be represented as login→order creation in the test process model. This interaction path would indicate that a "logout" must happen only after a "login" activity.

Thereafter, at 408, one or more alternate interaction paths between the one or more processes may be identified automatically from the business process model. An alternate interaction path may be identified depending on the processes that are being tested. In an embodiment, an alternate interaction path may be identified, when a decision branch is associated with a process that is being tested. In continuation of the example above, for the "login" process, an interaction path leading to "successful login" is already present in the business process model. However, an interaction path that leads to a "failed login" is not present in the business process model. Thus, this alternate interaction path is identified, and a new "failed login" process also gets created as a separate process. This new process is also included in the test process model, along with the alternate interaction path. In an embodiment, a user may also add additional interaction paths to the test process model. Thus, at 410, the test process model is constructed based on the plurality of processes and the one or more interaction paths identified at 406 and the one or more alternate interaction paths identified at 408. In other words, the test process model would include the plurality of processes, the one or more interaction paths, and the one or more alternate interaction paths. Thus, it is ensured that all participating processes in the business process model are covered in the test process model.

Referring back to 404, when the business process information does not include a business process model and includes business process instructions instead, the business process instruction, which are received in natural language from a user, are processed using a natural language processor at 412. Thereafter, at 414, a plurality of processes and one or more interaction paths amongst the plurality of processes are extracted from the business process instructions after these instructions have been processed by the natural language processor.

Business process instructions include activities that may be represented as actions, which are executed by actors. For example, "a user logging in" is an action executed by an actor. Any activity in the business process instructions that represents an action from a user gets extracted as a process. The translations happen based on identification of an actor and the activity performed by the actor. Thus, an action in the business process instructions, which is related to a business process activity is considered as a process. By way of an example, business process instructions provided by a user includes an action: "User must be able to login to an application using user name and password," which is followed by another action: "Create an order in the system by providing all the values." These actions are first separated out and the first action is identifying as a "login" process and the second action is identified as an "order creation" process. In this example, attributes, such as, username and password are covered within the "login" process and are thus not identified as separate processes in the test process model.

Thereafter, the control moves to 408, where one or more alternative interaction paths amongst the plurality of processes are identified. Thereafter, at 410, the test process model is constructed and includes the plurality of processes, the one or more interaction path, and the one or more alternate interaction paths. This has been explained in detail earlier. The test process model once constructed is used to identify a plurality of test scenarios. This is explained in detail in conjunction with FIGS. 5A and 5B given below.

Figure 5A:
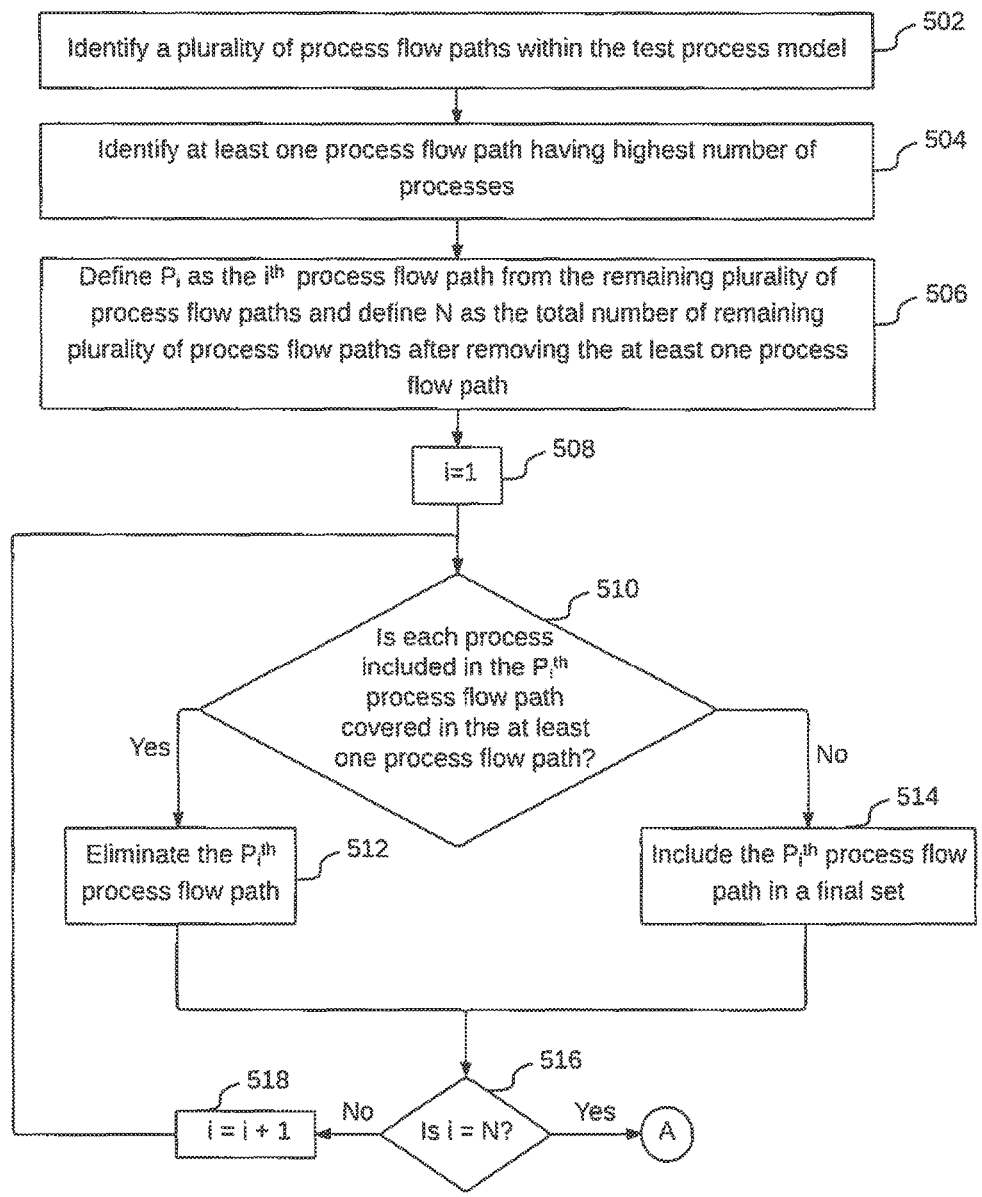
FIGS. 5A and 5B illustrates a flowchart of a method for identifying the plurality of test scenarios, in accordance with an embodiment.
Figure 5B:
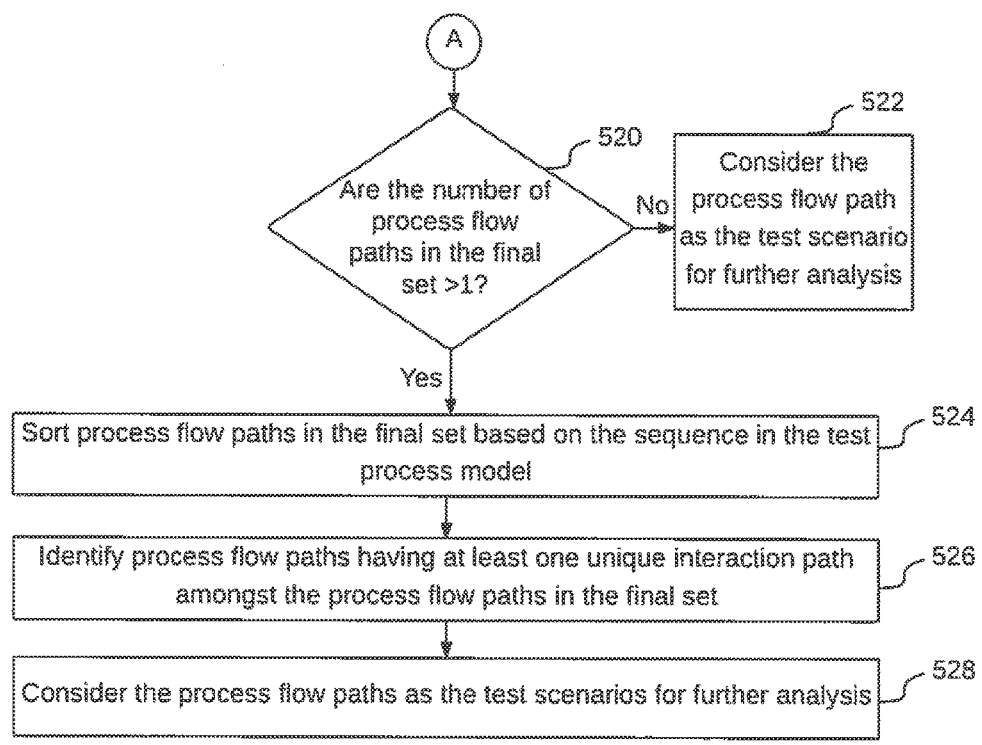

Referring now to FIGS. 5A and 5B, a flowchart of a method for identifying the plurality of test scenarios is illustrated, in accordance with an embodiment. To identify the plurality of test scenarios, a plurality of process flow paths are identified from the test process model at 502. Each test scenario includes a unique process flow path, which further includes one or more of the plurality of processes and one or more of the one or more interaction paths. In other words, each test scenario has a different process flow path. By way of an example, a process flow path may be represented as: a→b→c→d→e→f. This process flow path includes six processes, i.e., a, b, c, d, e, and f and five interaction paths, i.e., a→b, b→c, c→d, d→e, and e→f, where '→' represents an interaction path between two processes separated by '→.' By way of another example, the following five different process flow paths may be identified from the test process model: 1→2→3→4→6→7→9; 1→3→7→9; 1→3→5→6→7→9; 1→4→6→7→9; and 1→2→3→5→6→8→9.

At 504, one or more process flow paths that include the highest number of processes are identified from the plurality of process flow paths. In other words, there might be only one process flow path that includes the highest number of processes. Alternatively, there might be two or more process flow paths that include the same number of processes, which is the highest number. In this case, the two or more process flow paths are ordered based on the sequence they appear in the test process model. In continuation of the example given above, amongst the five process flow paths identified at 502, the following two process flow paths have the highest number of processes, i.e., seven processes: '1→2→3→4→6→7→9' and '1→2→3→5→6→8→9.' These two process flow paths are ordered based on the sequence they appear in the test process model.

Once the one or more process flow paths have been identified, a remaining plurality of process flow paths after removal of the one or more process flow paths are further analyzed. In continuation of the example given above, the remaining plurality of process flow paths would include the following process flow paths: 1→3→7→9; 1→3→5→6→7→9; and 1→4→6→7→9. Thereafter, at 506, a variable 'Pi' is defined as the ith process flow path from the remaining plurality of process flow paths and a variable N is defined as the total number of remaining plurality of process flow paths. In continuation of the example given above, N would be equal to three. At 508, T is assigned a value of 1 and an iterative process of eliminating process flow paths from the remaining plurality of process flow paths begins thereafter.

In this iterative process, at 510, a check is performed to determine whether each process included in the Pith process flow path is covered in the one or more process flow paths identified at 504. When each process in the Pith process flow path is covered in the one or more process flow paths, the Pith process flow path is eliminated at 512. However, if one or more processes in the Pith process flow path are not covered in the one or more process flow paths identified at 504, the Pith process flow path is included in a final set at 514. The final set already includes the one or more processes that include the highest number of processes (identified at 504). In continuation of the example above, P1 process flow path is: 1→3→5→6→7→9, P2 process flow path is: 1→4→6→7→9, and P3 process flow path is: 1→3→7→9.

After each of 512 and 514, a check is performed at 516 to determine whether 'i'=N, i.e., the total number of process flow paths in the remaining plurality of process flow paths. If T is not equal to N, the current value of 'i' is incremented by 1 at 518 and subsequently the control moves back to 510. In continuation of the example above, three iterations of comparing process flow paths with the one or more process flow paths having the highest number of processes is performed. In the first iteration, when 'i'=1, processes in P1, i.e., 1→3→5→6→7→9 are compared with the process flow paths having the highest number of processes, i.e., '1→2→3→4→6→7→9' and '1→2→3→5→6→8→9.' As each of the processes: 1, 3, 5, 6, 7, and 9 in P1 are covered in one or more of the process flow paths having the highest number of processes, P1 is eliminated. Since the current value of 'i' is 1, which is less than the value of N, i.e., 3, the value of 'i' is further incremented by 1, such that, the current value of 'i' becomes 2. Thereafter, the second iteration starts, where P2, i.e., 1→4→6→7→9, is compared with the process flow paths having the highest number of processes and is subsequently eliminated. Similarly, in the third and the last iteration, where the value of 'i'=3, P3, i.e., 1→3→7→9, is compared with the process flow paths having the highest number of processes and is subsequently eliminated. As a result, each of the remaining plurality of process flow paths, i.e., P1, P2, and P3, is eliminated. Thus, only the following process flow paths are included in the final set: '1→2→3→4→6→7→9' and '1→2→3→5→6→8→9.'

This iterative process ensures that all the process flow paths in the remaining plurality of process flow paths have been compared with the process flow paths having the highest number of processes. The process of iterative elimination of redundant process flow paths ensures that only those process flow paths that have unique processes are included in the final set.

Referring back to 516, when the value of is equal to the value of 'N,' at 520, a check is performed to determine whether the number of process flow paths in the final set is greater than one. If there is just one process flow path in the final set, that single process flow path, at 522, is considered as the test scenario to be used for further analysis. The further analysis is explained in detail in conjunction with FIG. 6.

Referring back to 520, if there are more than one process flow paths in the final set, the process flow paths in the final set are sorted based on their sequence in the test process model at 524. By way of an example, the final set may include four different process flow paths of equal length (six interaction paths each) that are sorted in the following order: (a) 1→2→3→5→6→8→9; (b) 1→2→4→5→7→8→9; (c) 1→2→3→5→7→8→9; and (d) 1→2→4→5→6→8→9. Thereafter, amongst the process flow paths in the final set, those process flow paths that have at least one unique interaction path are identified at 526. To this end, in an embodiment, an interaction path in the process flow path, which is last in the sorted sequence, is compared with interaction paths in process flow paths listed above it in the sorted sequence. If each interaction path in this process flow path is covered in other process flow paths above it, then this process flow path is eliminated. This comparison is repeated for each process flow path in the final set, till only those process flow paths are left that include at least one unique interaction path that is not covered in other process flow paths in the final set. In continuation of the example above, interaction paths in the process flow path (d), which is last in the sequence, are compared with interaction paths in each of the process flow paths (a), (b), and (c). Each interaction path in the process flow path (d) is covered in either of the process flow paths (a), (b), or (c). Similarly, each interaction path in the process flow path (c) is covered in either of the process flow paths (a) or (b). Thus, the process flow paths (c) and (d) become redundant and are eliminated. As a result, in the current example, only two unique process flow paths, i.e., (a) and (b) are left for further analysis.

At 528, the process flow paths identified at 526 that have at least one unique interaction path are considered as test scenarios, which would be assigned a risk weight and a criticality weight for further analysis. This is further discussed in detail in conjunction with FIG. 6 given below.

Figure 6:
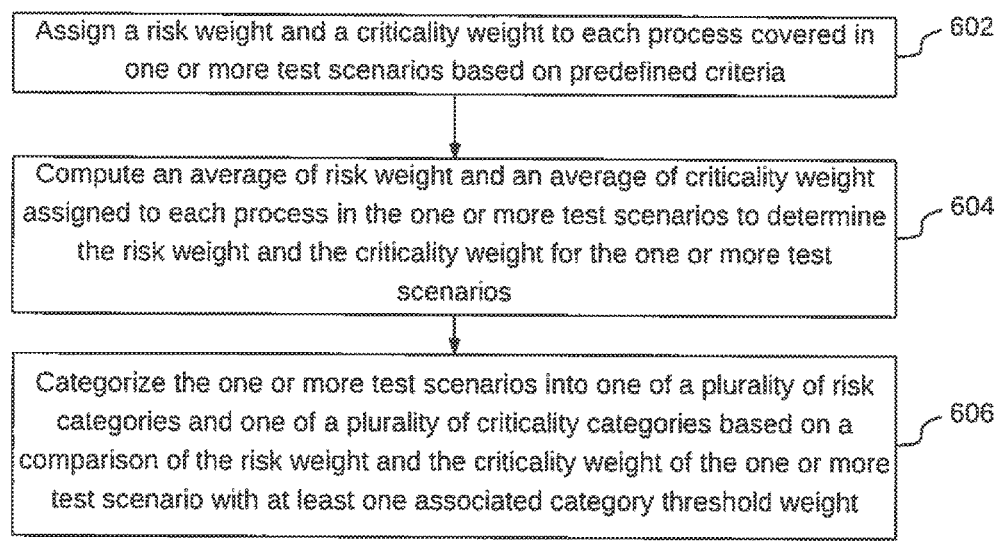
FIG. 6 illustrates a flowchart of a method for determining a risk weight and a criticality weight for one or more test scenarios, in accordance with an embodiment.

Referring now to FIG. 6, a flowchart of a method for determining a risk weight and a criticality weight for one or more test scenarios is illustrated, in accordance with an embodiment. The one or more test scenarios have been identified after elimination of process flow paths based on the number of processes and the interaction paths. Each of the one or more test scenarios have at least one unique process and at least one unique interaction path. At 602, a risk weight and a criticality weight is assigned to each process covered in the one or more test scenarios based on predefined criteria. In an embodiment, risks and criticality inputs for one or more processes may be received from a user via UI 120. The user may identify a particular process as one or more of "high critical," "high risk," "medium risk," "medium critical," "low risk," or "low critical". These inputs may be provided along with the business process instructions provided by the user. In this embodiment, based on the user inputs, one of the one or more test scenarios that includes one or more "high critical" processes are automatically categorized as critical test scenarios. By way of an example, the user may indicate that a "login" process is "high critical" process, thus the test scenarios that include the "login" process, are automatically identified as "critical" test scenarios. One such scenario that includes the "login" process may be "performing a banking transaction after Login."

In another embodiment, when risk and criticality inputs are not received from the user, risk and criticality levels and weights for processes in the one or more test scenarios are identified based on occurrence of these processes in each of the one or more test scenarios. By way of an example, a process is identified as a "high risk" and "high critical" process, in case at least six test scenarios include this process. By way of another example, a process would be identified as a "medium risk" and "medium critical" process, in case at least three and at most five test scenarios include this process. By way of yet another example, a process would be identified as a "low risk" and "low critical" process, in case less than three test scenarios include this process. These thresholds for identifying a process as high, low, or medium on risk and criticality can be modified by the user via UI 120.

Each of these risk level or criticality level have may have an associated weight assigned to it. These weights may be modified by a user via UI 120. By way of an example, "high risk" may have a weight of 0.8 associated with it, "medium risk" may have a weight of 0.6 associated with it, and "low risk" may have a weight of 0.4 associated with it.

Thereafter, at 604, an average of risk weight and an average of criticality weight assigned to each process in the one or more test scenarios is computed to determine the risk weight and the criticality weight for each of the one or more test scenarios. By way of an example, "opening of a bank account" is a test scenario that includes the following processes: "logging into the system," "collection of personal details," "validation of identity proofs," and "creation of customer record and submitting customer creation." The risk level identified for each of these processes and the associated weights are given in table 1 below:

TABLE 1

| Process | Risk Level | Associated Risk weight |
|---|---|---|
| Logging into the system | High risk | 0.8 |
| Collection of personal details | Medium risk | 0.6 |
| Validation of identity proofs | High risk | 0.8 |
| Creation of customer record and submitting customer creation | High risk | 0.8 |

A risk weight for the test scenario of "opening of a bank account" is determined by computing an average of the risk weights assigned to processes listed in table 1. This risk weight is computed as 0.75. In a similar manner, a criticality weight may be computed for the test scenario. Once the risk weight and criticality weight for each of the one or more test scenarios has been determined, the one or more test scenarios are categorized, at 606, into one of a plurality of risk categories and one of a plurality of criticality categories based on a comparison of the risk weight and the criticality weight of the one or more test scenarios with at least one associated category threshold weight. In continuation of the example given above, category threshold weights to categorize a test scenario into a risk category are given in table 2 below. The threshold weights may be modified by the user via UI 120:

TABLE 2

| Risk Category | Threshold Weight |
|---|---|
| High Risk | >0.7 |
| Medium Risk | >=0.3 |
| Low Risk | <0.3 |

Based on the threshold weights given in table 2, the test scenario of "opening of a bank account" is categorized as high risk, as its risk weight of 0.75 is greater than 0.7. Similarly, a critical category may also be determined for this test scenario.

After a risk weight and a criticality weight has been determined for each of the one or more test scenarios and after they have been categorized into a relevant risk category and criticality category, one or more of these one or more test scenarios are fed into test scenario generator module 210. In an embodiment, the criterion may be that these test scenarios should belong to a particular category of risk or criticality. By way of an example, only those test scenarios that are categorized as "high risk" are fed into test scenario generator module 210. In another embodiment, the criterion may be that these test scenarios should have a risk weight or a criticality weight greater than a predefined threshold. By way of an example, only those test scenarios that have a risk weight greater than 0.7 are fed into test scenario generator module 210. Test scenario generator module 210 then generates these test scenarios, along with executable test data.

This is then fed back into test management system 110 using the respective API or via the web service.

Figure 7:
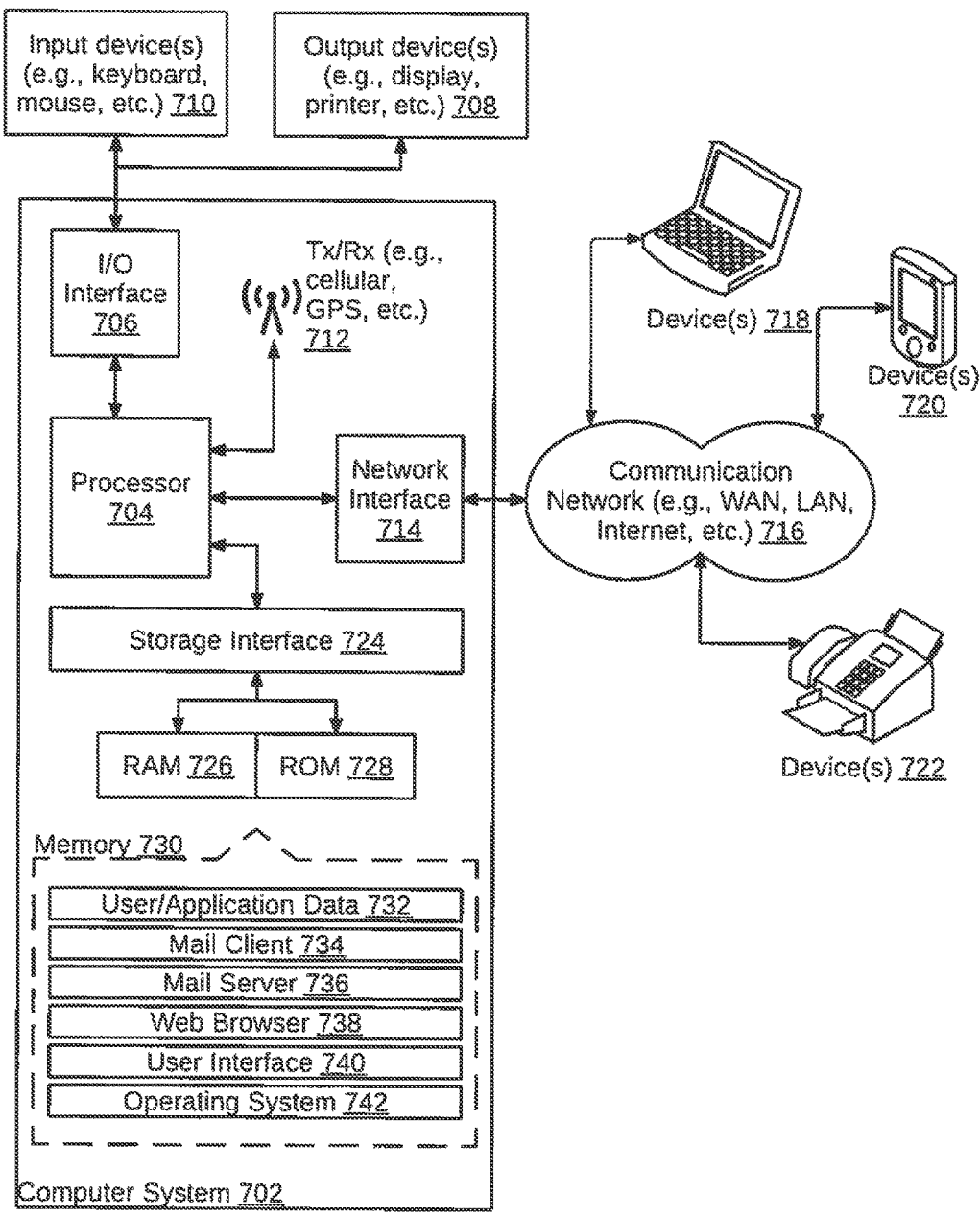
FIG. 7 illustrates a block diagram of an exemplary computer system for implementing various embodiments.

FIG. 7 is a block diagram of an exemplary computer system for implementing various embodiments. Computer system 702 may comprise a central processing unit ("CPU" or "processor") 704. Processor 704 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 702 may itself embody one or more of these devices.

In some embodiments, processor 704 may be disposed in communication with one or more memory devices (e.g., RAM 726, ROM 728, etc.) via a storage interface 724. Storage interface 724 may connect to memory devices 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 730 may store a collection of program or database components, including, without limitation, an operating system 732, a user interface application 734, a web browser 736, a mail server 738, a mail client 740, a user/application data 742 (e.g., any data variables or data records discussed in this disclosure), etc. Operating system 732 may facilitate resource management and operation of the computer system 702. Examples of operating system 732 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 702 may implement web browser 736 stored program component. Web browser 736 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 702 may implement mail server 738 stored program component. Mail server 738 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement mail client 740 stored program component. Mail client 740 may be a mail viewing application, such as Apple Mail, Microsoft Entourage, Microsoft Outlook, Mozilla Thunderbird, etc.

In some embodiments, computer system 702 may store user/application data 742, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using Obj ectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide method and system for generating integrated test scenarios. These method and system enable efficient management of test suite for regression testing as well as functional testing and results in reduction of cycle time for completion of testing. These methods and systems also provide better coverage of functional requirements while testing minimal test cases. Moreover, the visual representation facilitates better management of test cases.

The specification has described method and system for generating integrated test scenarios. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for generation of integrated test scenarios, the method comprising:
    creating, by a computing device, a test process model comprising a plurality of processes and one or more interaction paths amongst the plurality of processes based on business process information, wherein an interaction path between two processes from the plurality of processes define a flow between the two processes;
    identifying, by the computing device, a plurality of test scenarios based on an analysis of the plurality of processes and the one or more interaction paths amongst the plurality of processes, wherein each of the plurality of test scenarios comprises a unique process flow path comprising at least one of the plurality of processes and at least one of the one or more interaction paths;
    determining, by the computing device, a risk weight and a criticality weight associated with each of the plurality of test scenarios; and
    identifying, by the computing device, at least one test scenario from the plurality of test scenarios based on a comparison of the risk weight and the criticality weight determined for each of the plurality of test scenarios with an associated threshold weight.

2. The method of claim 1, wherein the business process information comprises a business process model or a business process instruction in natural language provided by a user.

3. The method of claim 2, wherein creating the test process model comprises:
    analyzing the business process information to extract the plurality of processes and the one or more interaction paths amongst the plurality of processes; and
    constructing a test process model based on the plurality of processes and the one or more interaction paths.

4. The method of claim 3 further comprising identifying at least one alternate interaction path amongst the plurality of processes.

5. The method of claim 3 further comprising processing the business process instructions using a natural language processor, wherein while extracting the plurality of processes and the one or more interaction paths from the business process instructions, an action related to a business process activity in the business process instructions is identified as a process.

6. The method of claim 1, wherein identifying the plurality of test scenarios comprises:

identifying a plurality of process flow paths within the test process model; and eliminating at least one process flow path from the plurality of process flow paths based on at least one of: a number of processes or a number of interaction paths in the at least one process flow path, wherein each process or each interaction path in the at least one process flow path is covered in at least one of a remaining plurality of process flow paths, the remaining plurality of process flow paths being obtained post elimination of the at least one process flow path from the plurality of process flow paths.

7. The method of claim 1 further comprising receiving risk and criticality level inputs along with the business process information, the risk weight and the criticality weight associated with each of the plurality of test scenarios being determined base d on the risk and criticality inputs.

8. The method of claim 1, wherein determining a risk weight and a criticality weight for a test scenario from the plurality of test scenarios comprises:

assigning a risk weight and a criticality weight to each process covered in the plurality of test scenarios based on predefined criteria; and computing an average of risk weight and an average of criticality weight assigned to each process in the test scenario to determine the risk weight and the criticality weight for the test scenario.

9. The method of claim 8 further comprising categorizing the test scenario into one of a plurality of risk categories and one of a plurality of criticality categories based on a comparison of the risk weight and the criticality weight of the test scenario with at least one associated category threshold weight.

10. The method of claim 1 further comprising executing the at least one test scenarios and storing result of the executing.

11. A computing device comprising:

a processor; and a memory communicatively coupled to the processor, wherein the memory stores processor instructions, which, on execution, causes the processor to:

create test process model comprising a plurality of processes and one or more interaction paths amongst the plurality of processes based on business process information, wherein an interaction path between two processes from the plurality of processes define a flow between the two processes;

identify a plurality of test scenarios based on an analysis of the plurality of processes and the one or more interaction paths amongst the plurality of processes, wherein each of the plurality of test scenarios comprises a unique process flow path comprising at least one of the plurality of processes and at least one of the one or more interaction paths;

determine a risk weight and a criticality weight associated with each of the plurality of test scenarios; and identify at least one test scenario from the plurality of test scenarios based on a comparison of the risk weight and the criticality weight determined for each of the plurality of test scenarios with an associated threshold weight.

12. The computing device of claim 11, wherein the business process information comprises a business process model or a business process instruction in natural language provided by a user.

13. The computing device of claim 12, wherein to create the test process model, the processor instructions further cause the processor to:

analyze the business process information to extract the plurality of processes and the one or more interaction paths amongst the plurality of processes; and construct a test process model based on the plurality of processes and the one or more interaction paths.

14. The computing device of claim 13, wherein the processor instructions further cause the processor to identify at least one alternate interaction path amongst the plurality of processes.

15. The computing device of claim 13, where the processor instructions further cause the processor to process the business process instructions using a natural language processor, wherein while extracting the plurality of processes and the one or more interaction paths from the business process instructions, an action related to a business process activity in the business process instructions is identified as a process.

16. The computing device of claim 11, wherein to identify the plurality of test scenarios the processor instructions further cause the processor to:

identify a plurality of process flow paths within the test process model; and eliminate at least one process flow path from the plurality of process flow paths based on at least one of: a number of processes or a number of interaction paths in the at least one process flow path, wherein each process or each interaction path in the at least one process flow path is covered in at least one of a remaining plurality of process flow paths, the remaining plurality of process flow paths being obtained post elimination of the at least one process flow path from the plurality of process flow paths.

17. The computing device of claim 11, wherein the processor instructions further cause the processor to receive risk and criticality level inputs along with the business process information, the risk weight and the criticality weight associated with each of the plurality of test scenarios being determined based on the risk and criticality inputs.

18. The computing device of claim 11, wherein to determine a risk weight and a criticality weight for a test scenario from the plurality of test scenarios, the processor instructions further cause the processor to:

assign a risk weight and a criticality weight to each process covered in the plurality of test scenarios based on predefined criteria; and compute an average of risk weight and an average of criticality weight assigned to each process in the test scenario to determine the risk weight and the criticality weight for the test scenario.

19. The computing device of claim 18, wherein the processor instructions further cause the processor to categorize the test scenario into one of a plurality of risk categories and one of a plurality of criticality categories based on a comparison of the risk weight and the criticality weight of the test scenario with at least one associated category threshold weight.

20. A non-transitory computer-readable storage medium having stored thereon, a set of computer-executable instructions for generating integrated test scenarios, causing a computer comprising one or more processors to perform steps comprising:

creating a test process model comprising a plurality of processes and one or more interaction paths amongst the plurality of processes based on business process information, wherein an interaction path between two processes from the plurality of processes define a flow between the two processes;

identifying a plurality of test scenarios based on an analysis of the plurality of processes and the one or more interaction paths amongst the plurality of processes, wherein each of the plurality of test scenarios comprises a unique process flow path comprising at least one of the plurality of processes and at least one of the one or more interaction paths;

determining a risk weight and a criticality weight associated with each of the plurality of test scenarios; and identifying at least one test scenario from the plurality of test scenarios based on a comparison of the risk weight and the criticality weight determined for each of the plurality of test scenarios with an associated threshold weight.

* * * * *